US011917456B2

(12) United States Patent
Jagannatha et al.

(10) Patent No.: US 11,917,456 B2
(45) Date of Patent: *Feb. 27, 2024

(54) SYSTEMS AND METHODS OF APPLICATION MAPPING FOR NETWORK SLICING USING GROUP SEGMENTATION

(71) Applicant: Verizon Patent and Licensing Inc., Basking Ridge, NJ (US)

(72) Inventors: Deepa Jagannatha, Bridgewater, NJ (US); Bharadwaj Vemuri, Jersey City, NJ (US); Kartik P. Umamaheswaran, Belle Mead, NJ (US); Garima Garg, Livingston, NJ (US); Balaji L Raghavachari, Bridgewater, NJ (US); Kalyani Bogineni, Irving, TX (US); Kristen Sydney Young, Morris Plains, NJ (US); Ratul K. Guha, Warwick, PA (US); Sudhakar Reddy Patil, Flower Mound, TX (US); Violeta Cakulev, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/736,407

(22) Filed: May 4, 2022

(65) Prior Publication Data

US 2022/0264374 A1 Aug. 18, 2022

Related U.S. Application Data

(63) Continuation of application No. 17/084,720, filed on Oct. 30, 2020, now Pat. No. 11,356,899.

(51) Int. Cl.
*H04W 28/24* (2009.01)
*H04W 8/04* (2009.01)
(Continued)

(52) U.S. Cl.
CPC ............ *H04W 28/24* (2013.01); *H04W 8/04* (2013.01); *H04W 48/17* (2013.01); *H04W 88/02* (2013.01)

(58) Field of Classification Search
CPC ....... H04W 8/04; H04W 28/16; H04W 28/24; H04W 48/17; H04W 48/18; H04W 72/543; H04W 88/02
See application file for complete search history.

(56) References Cited

U.S. PATENT DOCUMENTS

| 2019/0053104 A1* | 2/2019 | Qiao | H04W 28/0268 |
| 2020/0053083 A1* | 2/2020 | Kunz | H04L 69/329 |
| 2020/0236528 A1* | 7/2020 | Lee | H04W 8/00 |

\* cited by examiner

*Primary Examiner* — Khoa Huynh

(57) ABSTRACT

Systems and methods described herein use group segmentation of applications (referred to herein as "slicing classes"), based on common service requirements, to allow carriers to assign UE traffic to network slices. A UE stores slicing class definitions for use with UE Route Selection Policies (URSP). Each of the slicing class definitions include network quality of service (QoS) characteristics that are applicable to network traffic for multiple software applications. The UE maps the software applications to corresponding slicing class identifiers associated with the slicing class definitions. The UE also stores URSP rules for associating a slicing class identifier with a network slice identifier. A UE operating system sends, to a modem, one of the slicing class identifiers for an application that is requesting attachment to a wireless network. The modem sends a registration request with a selected network slice identifier based on the received slicing class identifier and the URSP rules.

20 Claims, 9 Drawing Sheets

(51) Int. Cl.
*H04W 48/00* (2009.01)
*H04W 88/02* (2009.01)

SYSTEMS AND METHODS OF APPLICATION MAPPING FOR NETWORK SLICING USING GROUP SEGMENTATION

CROSS-REFERENCE TO RELATED APPLICATION

This patent application is a continuation of U.S. patent application Ser. No. 17/084,720, entitled "Systems and Methods of Application Mapping for Network Slicing Using Group Segmentation" and filed on Oct. 30, 2020, the disclosure of which is incorporated herein by reference in its entirety.

BACKGROUND

Development and design of radio access networks (RANs) and core networks present certain challenges from a network-side perspective and an end device perspective. For example, from both network-side and end device-side perspectives, some configurations may reduce the effective use of resources. Accordingly, a need exists to overcome these challenges.

DETAILED DESCRIPTION OF EXAMPLE EMBODIMENTS

Figure 1:
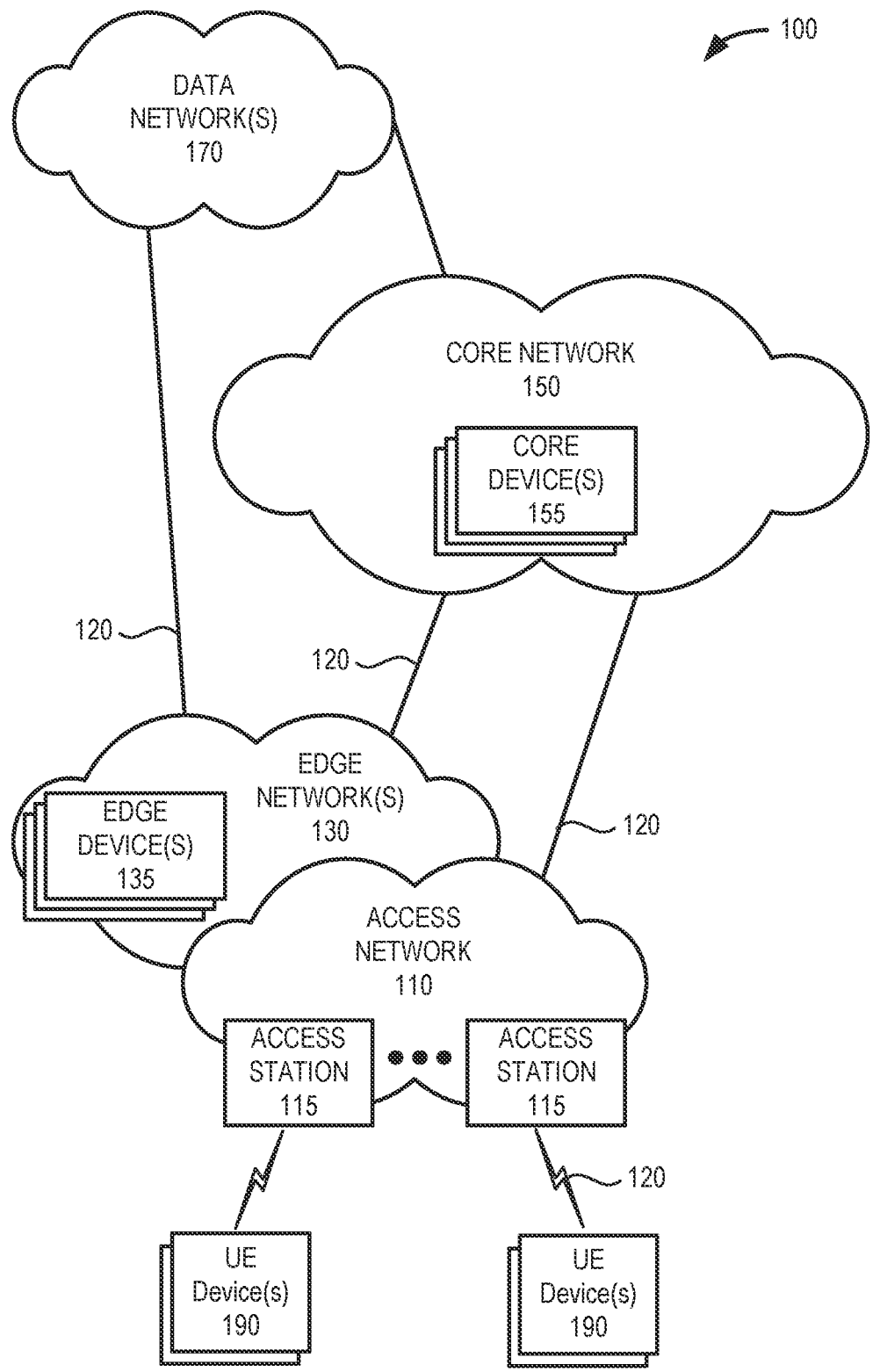
FIG. 1 is a diagram illustrating an exemplary environment in which an exemplary embodiment of an application-based access control service may be implemented.

The following detailed description refers to the accompanying drawings. The same reference numbers in different drawings may identify the same or similar elements. Also, the following detailed description does not limit the invention.

User equipment (UE) devices may execute various applications that generate network traffic with different service requirements. To better manage traffic for different types of applications, UE Route Selection Policies (URSP) have been proposed as a device-side feature in the 5G standalone (SA) architecture. The URSP framework provides traffic steering rules for the UE device and enables the UE device to determine how a certain application should be handled in the context of traffic routing to an appropriate network slice. A network slice refers to a complete logical network including components of a Radio Access Network (RAN) and Core Network that provide certain telecommunication services and network capabilities that can vary from slice to slice. Selection of network slices for a particular application can, thus, have significant impact on network performance and user experience.

The current URSP framework supports different types of Traffic Descriptors for mapping UE traffic by selecting appropriate routes that are pre-defined by operator (or carrier) policies. Different Traffic Descriptors defined by 3GPP are accorded different precedence or priority. Current Traffic Descriptors include Application Identifiers (App ID), Data Network Name (DNN), Connection Capabilities, Internet Protocol (IP) Descriptors, Fully-Qualified Domain Name (FQDN), and Non-IP Descriptors. A UE device applies different URSP rules for route selection based on, for example, the highest precedential Traffic Descriptor that is associated with an application. The App ID, in particular, is generally assigned the highest precedence and provides identification of a single application (e.g., FACETIME, YOUTUBE, FORTNITE, ACCUWEATHER, etc.).

URSP is typically stored in the subscriber identity module (SIM) or modem of a UE device. The UE device provides a selected Route Selection Descriptor (RSD, e.g., selected based on an application's Traffic Descriptors) to the carrier network during an attachment procedure. Ideally, the URSP allows UE device to match an application, with its specific network service requirements, via the App ID and/or other Traffic Descriptors, to a specific network slice that is configured to provide the required level of service for the application.

However, the transfer of an App ID, when associated with a particular UE device, raises privacy concerns for customers. Furthermore, with millions of App IDs, managing and updating registrations of App IDs with individual carriers can become burdensome. Currently, none of the Traffic Descriptors defined for the URSP framework describes a type of service that could help map application services to network slices in an efficient way and also protect customer privacy.

Systems and methods described herein use group segmentation of applications (referred to herein as "slicing classes"), based on common service requirements, to allow carriers to assign UE traffic to a network slice at attachment based on customer service elections for an application (instead of a specific App ID, for example). In one implementation, the current URSP framework is extended to include a Slicing Service Profile (SSP) as a new Traffic Descriptor. The SSP Traffic Descriptor may be given the highest precedence among standardized Traffic descriptors (e.g., above, or in place of, the App ID). Each SSP may be associated with particular quality of service (QoS) requirements, such as latency, packet error rate, bandwidth, etc., so that a single SSP may represent multiple applications with the same QoS requirements. According to an implementation, an operating system (OS) on a UE device may map each installed application to an SSP. The UE device may provide the SSP to the carrier network with a registration request or another message at the time of attachment. Using the SSP, the carrier may assign an appropriate network slice for the UE/application that meets the applications QoS requirements.

According to another implementation, standardized slicing classes may be used to assign network slices to groups of application associated with an enterprise. In still another implementation, individual applications selected for differentiated services (e.g. via partnerships with application developers and mobile carriers) may be identified by a standardized slicing classes that are reserved for particular mobile carriers.

FIG. 1 is a diagram illustrating an exemplary environment 100 in which an exemplary embodiment of where slicing classes may be implemented. As illustrated, environment 100 includes an access network 110, edge networks 130, a core network 150, and one or more data networks 170. Access network 110 includes access stations 115, edge network 130 includes edge devices 135, and core network 150 includes core devices 155. Environment 100 further includes UE devices 190.

The number, the type, and the arrangement of network devices and the number of UE devices 190 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between UE devices 190 and the network devices. Environment 100 may be implemented to include wired, optical, and/or wireless communication links 120 among the network devices and the networks illustrated. A connection via a communication link 120 may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 110 may include one or multiple networks of one or multiple types and technologies. For example, access network 110 may include a Fifth Generation (5G) radio access network (RAN), Fourth Generation (4G) RAN, and/or another type of future generation RAN. By way of further example, access network 110 may be implemented to include a 5G New Radio (5G NR) RAN, an Evolved UMTS Terrestrial Radio Access Network (E-UTRAN) of a Long Term Evolution (LTE) network, an LTE-Advanced (LTE-A) network, and/or an LTE-A Pro network, and/or another type of RAN (e.g., a legacy RAN). Access network 110 may further include other types of wireless networks, such as a WiFi network, a Worldwide Interoperability for Microwave Access (WiMAX) network, a local area network (LAN), or another type of network that may provide an on-ramp to access stations 115 and/or core network 150.

Depending on the implementation, access network 110 may include one or multiple types of access stations 115. For example, access station 115 may include a next generation Node B (gNB) for a 5G NR RAN, an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. According to various embodiments, access network 110 may be implemented according to various wireless technologies (e.g., radio access technology (RAT), etc.), wireless standards, wireless frequencies/bands, and so forth. According to an implementation, access stations 115 may include a gNB with multiple distributed components, such as a central unit (CU), a distributed unit (DU), a remote unit (RU or a remote radio unit (RRU)), or another type of distributed arrangement. As further discussed below, access stations 115 (as part of access network 110) may be part of a Self-Organizing Network (SON) that may be reconfigured by another component in networks 110, 130, and/or 150.

Edge network 130 includes a platform that provides application services at the edge of a network, such as application services for UE devices 190. For example, edge network 130 may be implemented as a Multi-access Edge Compute (MEC) platform. Edge network 130 may be implemented using one or multiple technologies including, for example, network function virtualization (NFV), software defined networking (SDN), cloud computing, or another type of network technology. Edge network 130 may include network devices (e.g., edge devices 135) located to provide geographic proximity to various groups of wireless stations 110. In some embodiments, components of edge network 130 may be co-located with access station 115 in access network 110. In other embodiments, access stations 115 may connect to edge network 130 via wired (e.g., optical) backhaul links 120.

Core network 150 may include one or multiple networks of one or multiple types and technologies. According to an exemplary embodiment, core network 150 includes a complementary network of access network 110. For example, core network 150 may be implemented to include a next generation core (NGC) for a 5G network. In other implementation, core network 150 may also include an EPC of an LTE, a core network of an LTE-Advanced (LTE-A) network, and/or a core network of an LTE-A Pro network. Core network 150 may also include a legacy core network.

Depending on the implementation, core network 150 may include various types of network devices, such as core devices 155. For example, core devices 155 may include 5G core components and/or combined 4G/5G core components, such as a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a mobility and management entity (MME), a session management function (SMF), a unified data management (UDM) device, an authentication server function (AUSF), a network slice selection function (NSSF), a network repository function (NRF), a policy control function (PCF), a network exposure function (NEF), and/or an application function (AF). According to other exemplary implementations, core devices 155 may include additional, different, and/or fewer network devices than those described. For example, core devices 155 may include a non-standard and/or proprietary network device. According to an exemplary embodiment, core device 155 includes logic that utilizes a URSP framework, as described herein.

Data network 170 may include one or multiple networks. For example, data network 170 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 170 may include various network devices that provide various applications, services, or other type of UE device assets (e.g., servers (e.g., web, application, cloud, etc.), mass storage devices, data center devices), and/or other types of network services pertaining to various network-related functions.

UE devices 190 may each include a mobile device, such as wireless or cellular telephone device (e.g., a conventional cell phone with data processing capabilities), a smart phone, a personal digital assistant (PDA) that can include a radiotelephone, etc. In another implementation, UE device 190 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, etc. In other implementations, UE devices 190 may be implemented as a machine-type communications (MTC) device, an Internet of Things (IoT) device, a machine-to-machine (M2M) device, etc., that includes communication functionality, such as a home appliance device, a home monitoring device, a camera, etc. UE devices 190 may connect to wireless stations 110 in a wireless manner. As described further herein, UE devices 190 may work within a URSP framework to locally map applications to segmented groups (e.g., SSP groups) and provide a corresponding slice identifier during an attachment procedure to route traffic for an application to an appropriate network slice.

Figure 2:
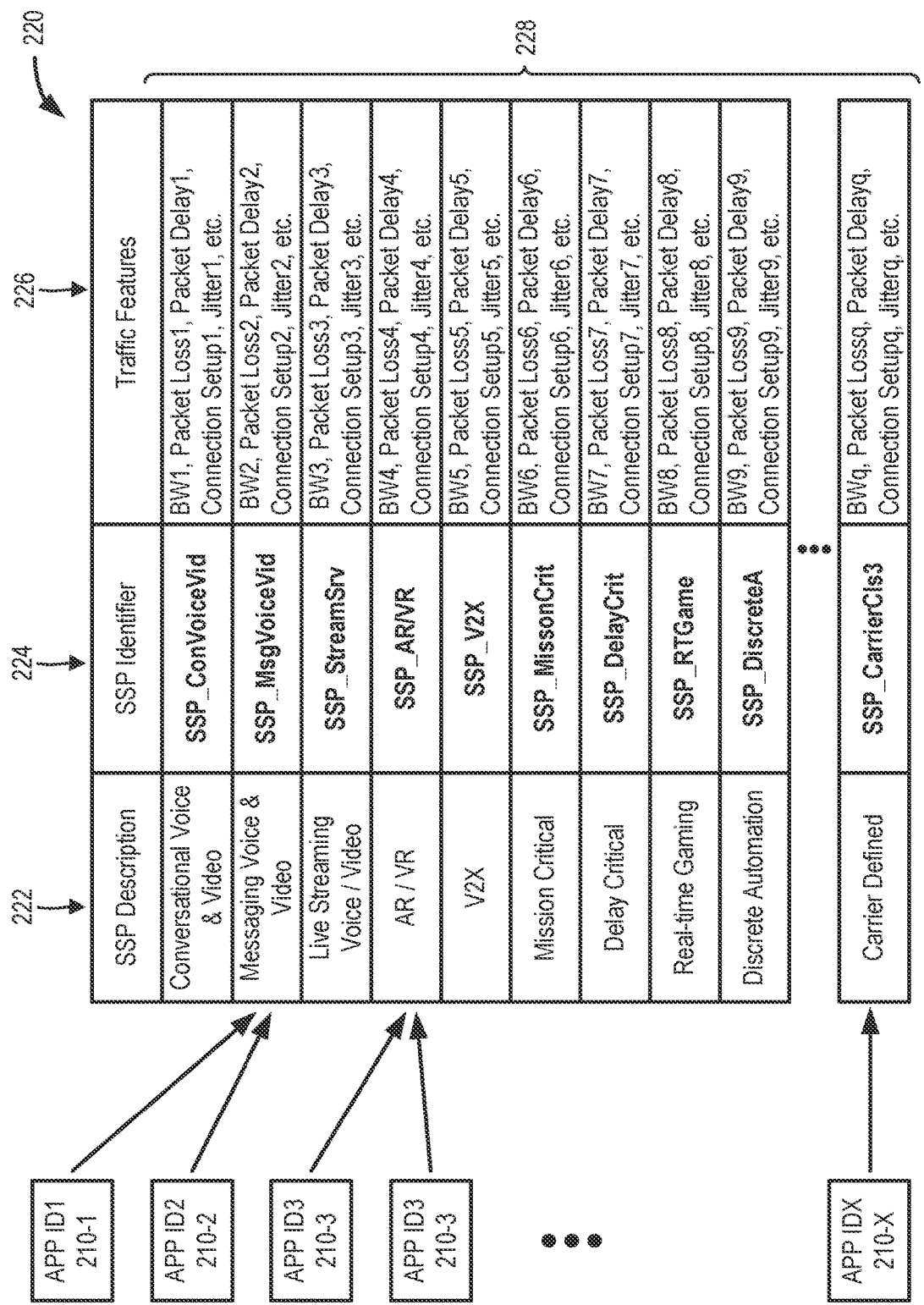
FIG. 2 is a diagram illustrating concepts described herein.

FIG. 2 is a diagram illustrating concepts of slicing class mapping that may be used according to an implementation. Applications (e.g., software applications) with App IDs 210-1 through 210-X (referred to herein collectively as App IDs 210) may each have corresponding QoS requirements, such as requirements for bandwidth (BW), packet loss, packet delay (e.g., latency), connection setup times, jitter, and the like. According to implementations described herein, individual App IDs 210 may be mapped to an abstraction layer that defines the QoS requirements for applications but conceals (or does not reveal) a corresponding App ID 210. Thus, a UE device may provide an indication of connection requirements to the network at the time of attachment without disclosing an App ID.

For applications installed on UE device 190, an operating system may match App IDs to groups with common QoS requirements. For example, an operating system of UE device 190 may be provided with data or a set of mapping rules to match application connection requirements with an SSP. Each SSP may identify QoS characteristics for network traffic. For purposes of illustration, a slicing class data structure 200 may include an SSP description field 222, an SSP name field 224, traffic features field 226, and a variety of records or entries 228 associated with each of fields 222, 224, and 226.

SSP description field 222 may include a descriptor of the type or category of services required by an application. For example, as shown in FIG. 2, categories for individual entries 228 may include Conversational Voice & Video, Messaging Voice & Video, Live Streaming Voice/Video, Augmented Reality (AR)/Virtual Reality (VR), Vehicle to Everything (V2X) communications, Mission Critical, Delay Critical, Real-time Gaming, Discrete Automation, etc. SSP description field 222 may also include one or more entries 228 for SSPs that are reserved for a particular wireless carrier (e.g., Carrier Defined). For example, as described further herein, a mobile carrier may have one or more slicing class that may be used to designate traffic handling for applications by a particular carrier.

SSP name field 224 may include a name associated with the corresponding SSP description field 222 and traffic features field 226 for each entry 228. According to an implementation, an SSP name from SSP name field 224 may be sent by UE device 190 to core network 150 using the URSP framework during an attachment procedure for an application.

Traffic features field 226 may include a network traffic requirements or QoS requirements associated with the corresponding SSP description field 222 and SSP name field 224 for each entry 228. Each entry 228 in traffic features field 226 may include a combination of traffic characteristics that include a minimum bandwidth value, a maximum packet loss rate, a maximum latency or packet delay, a maximum connection setup time, and a required jitter value. Traffic features in traffic features field 226 may be matched to network slice characteristics that are suitable for particular types of applications. Thus, multiple applications (e.g., multiple App IDs) with the same or similar requirements be mapped to the same SSP.

Figure 3:
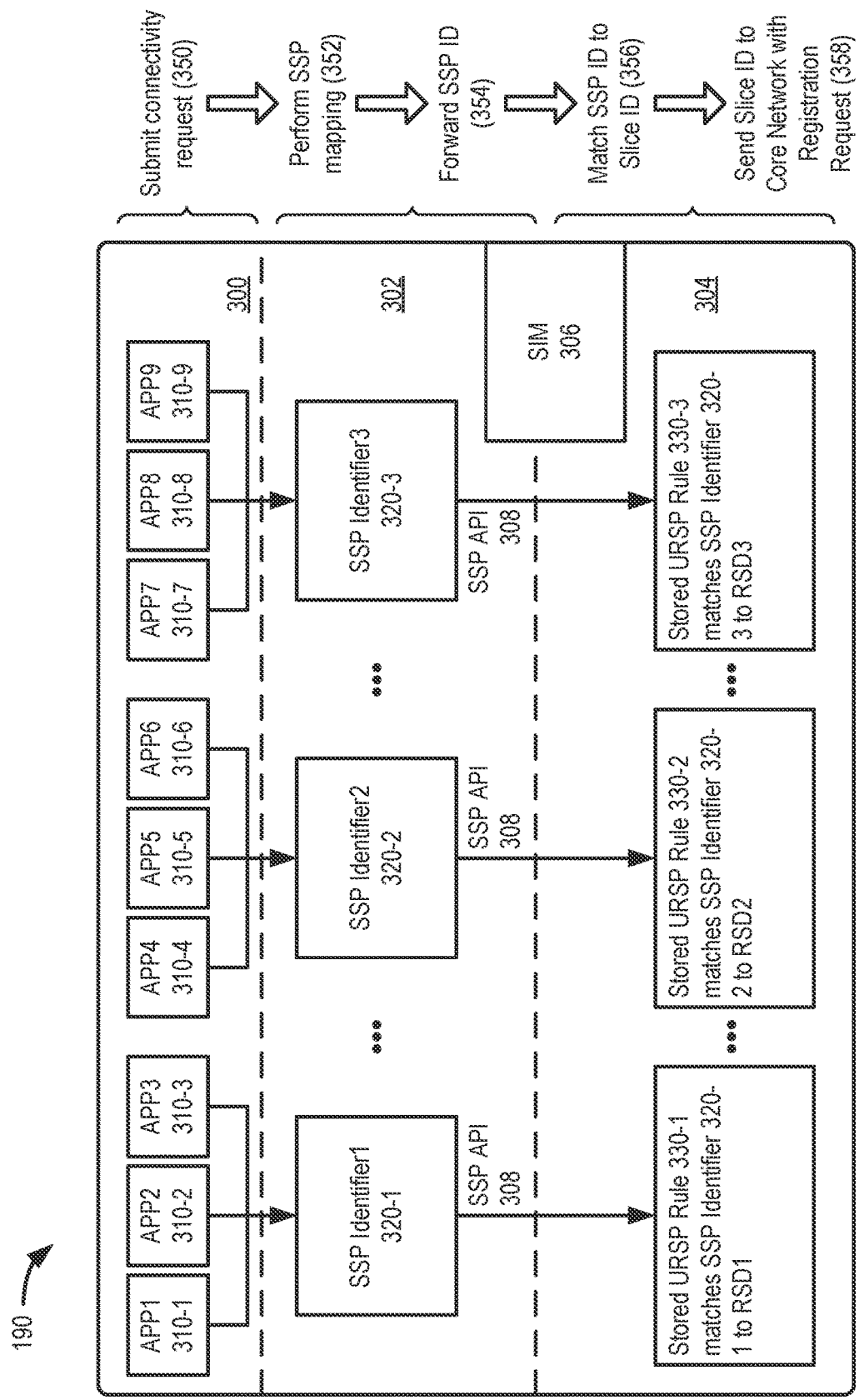
FIG. 3 is a diagram illustrating a slicing class mapping process performed by a user equipment (UE) device.

FIG. 3 is a diagram illustrating a slicing class mapping process that may be performed by UE device 190. As shown in FIG. 3, UE device 190 may include an application layer 300, an operating system 302, a modem 304, and a SIM 306. Application layer 300 may include multiple applications 310-1 through 310-9 that may require network connectivity (referred to collectively and generically as "application 310"). Operating system 302 may include software to perform various functions, such as provide memory management, provide a file system interface, manage time sharing of hardware resources, and provide an environment within which an application 310 can operate. Operating system 302 may be stored in a non-volatile memory device (e.g., a flash memory) or other suitable storage device. According to an implementation described herein, operating system 302 may pass slicing class information or other traffic descriptors to modem 304 to initiate an attachment procedure for an application.

Modem 304 may be configured to communicate with access station 115. For example, modem 304 may generate baseband signals and convert the generated baseband signal into RF signals to send to access station 115 and may receive RF signals from access station 115 and convert the received RF signals into baseband signals. Modem 304 may maintain a database of active communication sessions established via access station 115 and may store information identifying a QoS class or network slice associated with each active communication session.

SIM 306 may include a removable Universal Integrated Circuit Card (UICC) or an eSIM that is embedded in UE device 190. In other words, an eSIM may include an integrated SIM chip that is attached to a logic board and is not removable from UE device 115. SIM 306 may store subscription information associated with the user, such as, for example subscription IDs including an International Mobile Subscriber Identity (IMSI) number, a Mobile Station International Subscriber Directory Number (MSISDN), a Mobile Directory Number (MDN), etc. Furthermore, SIM 306 may store authentication and/or authorization information and URSP rules for obtaining access to access network 110 and/or core network 150.

Applications 310-1 through 310-9 (referred to collectively and generically as "application 310") may be stored as software in a memory of UE device 190. Each application 310 may have a set of QoS requirements for the application. Operating system 302 may be configured with the ability to assign a single application or group of applications to the same SSP identifier from a group of SSP Identifiers 320-1 through 320-3. Each of SSP Identifiers 320 may correspond, for example, to an SSP Identifier in field 224 of data structure 200.

As an example, applications 310-1, 310-2, and 310-3 stored on UE device 190 may all be conversational voice and video applications (e.g., FACETIME, GOOGLE MEET, ZOOM, SKYPE, etc.), which would have the same or similar requirements for bandwidth, packet loss, latency, connection setup time, jitter, etc. Operating system 302 may associate each of applications 310-1, 310-2, and 310-3 with the same SSP identifier 320 (e.g., SSP Identifier 1 320-1, which may correspond to "SSP_ConVoiceVid" of data structure 200). In one implementation, operating system 302 may be provided with rules to associate applications 310 with an appropriate SSP identifier 320. In another implementation, an SSP identifier 320 may be associated with an application as part of an application registration process prior to downloading (e.g., when application is made available through a distribution center, such as ITUNES or GOOGLE PLAY). Modem 304 may store URSP rules 330 and/or access the URSP rules 330 from SIM 306 or another secure element of UE device 190. The URSP rules may be include in a baseband and cellular protocol stack, for example.

According to one implementation, when an application 310 (e.g., application 310-2) is launched and/or otherwise requests network access (e.g., to access network 110 and/or core network 150), the application may submit a connectivity request with an App ID, as indicated by reference 350. Operating system 302 may receive the connectivity request and map the App ID to the corresponding SSP Identifier 320 (e.g., App ID for App1 310-1 is mapped to SSP Identifier 320-1), as indicated by reference 352. Operating system 302 may forward the corresponding SSP identifier to modem 304 without including the App ID, as indicated by reference 354. For example, operating system 302 may be configured with application programming interfaces (e.g., SSP APIs 308) to incorporate an SSP abstraction layer when forwarding traffic descriptors to modem 304.

Modem 304 may recognize the SSP Identifier 320 (e.g., SSP Identifier 320-1) as an SSP identifier which may be the highest priority Traffic Descriptor for selecting a URSP rule. Based on stored URSP rules, modem 304 may match the SSP identifier 320 (e.g., SSP Identifier 320-1) to a corresponding route selection descriptor (e.g., RSD1), as indicated by reference 356. In the example of FIG. 3, the route selection descriptor may include a network slice identifier (e.g., single network slice selection assistance information (S-NSSAI)) for core network 150. As indicated by reference 358 and described below in FIGS. 4A-4B, modem 304 may forward the route selection descriptor as part of an attachment procedure for the application.

Figure 4:
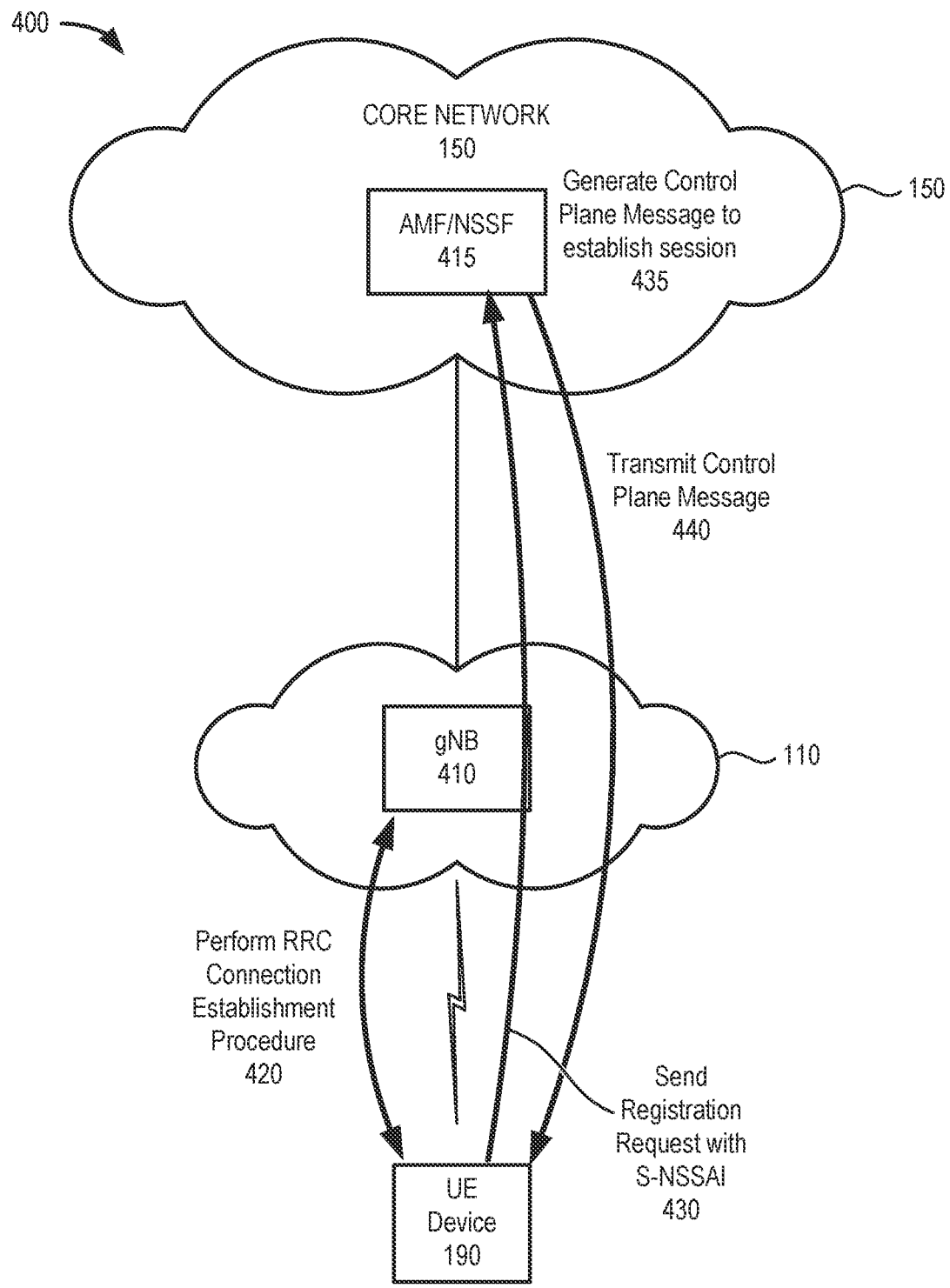
FIG. 4 is a diagram illustrating an exemplary process of using slicing classes.

FIG. 4 is a diagram illustrating an exemplary process of using slicing classes. As illustrated, an environment 400, which is consistent with a portion of environment 100, includes access network 110 including a gNB 410 (e.g., access device 115), core network 150 including an AMF/NSSF 415 (e.g., core device 155), and UE device 190. According to other exemplary embodiments, access device 115 and/or core device 155 may be a different type of network device.

Referring to FIG. 4, according to an exemplary scenario, assume that UE device 190 establishes a Radio Resource Control (RRC) connection with gNB 410 based on an RRC Connection Establishment procedure 420. Subsequently, as a part of an attachment procedure 425 between UE device 190 and core network 150, UE device 190 (e.g., modem 304) may generate a registration request 430, or attachment request, that includes S-NSSAI based on an SSP Identifier (e.g. SSP ID 320) for a certain application. According to an implementation, registration request 430 may include the S-NSSAI but not include an App ID for the application, thus protecting an aspect of user privacy. AMF/NSSF 415 may receive registration request 430 with the S-NSSAI.

AMF/NSSF 415 may process registration request 430. For example, AMF/NSSF 415 may confirm that the user plane of the selected network slice can support traffic for the application on UE device 190. Assuming the traffic can be supported, AMF/NSSF 415 may generate a control plane message 435 to establish a session based on registration request 430. According to other examples, control plane message 435 may be included in another type of control plane message that allows UE device 190 to establish a connection with edge network 130 or data network 170. AMF/NSSF 415 may generate the control plane message 435, which may identify a particular AMF to serve the application on UE device 190, and other network slice priority information, derived from registration request 430 and/or other information (e.g., policy information from a PCF/PCRF, UE device capability information, subscription information, or other information pertaining to UE device 190).

AMF/NSSF 415 may transmit the control plane message 435 to UE device 190. According to various examples, control plane message 440 may be included in a registration accept message or another type of message which may include allowed NSSAI and URSP. As illustrated, UE device 190 may receive the control plane message via gNB 410, and use the network slice priority information 445 for access to the network.

FIGS. 3 and 4 illustrate exemplary processes of using slicing classes. However, according to other exemplary embodiments, the process may include additional, different, and/or fewer steps, and/or include additional, different, and/or fewer messages. For example, according to an exemplary embodiment, UE device 190 may receive updates to the network slice priority information from core device 155 (e.g., AMF/NSSF 415, etc.).

Figure 5:
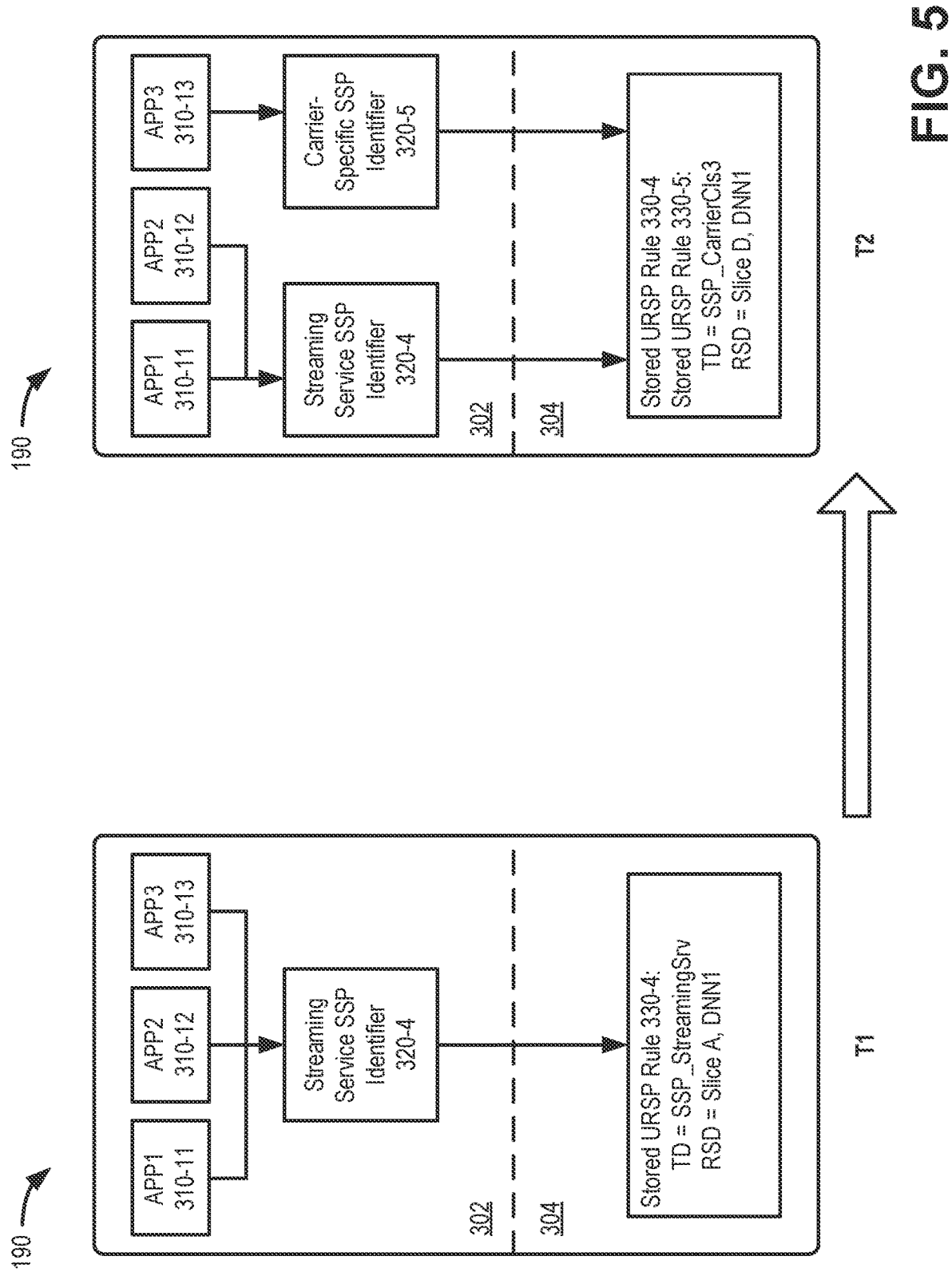
FIG. 5 is a diagram illustrating a slicing class mapping update process that may be performed by a UE device.

FIG. 5 is a diagram illustrating a slicing class mapping update process that may be performed by UE device 190. More particularly, FIG. 5 illustrates that an application's mapping to an SSP identifier may be changed. As described above in connection with FIG. 3, UE device 190 may include operating system 302 and modem 304.

In FIG. 5, assume applications 310-11 through 310-13 have the same or similar requirements for bandwidth, packet loss, latency, connection setup time, jitter, etc. For example, applications 310-11, 310-12, and 310-13 may each provide streaming video services. Under normal instructions, operating system 302 may associate each of applications 310-11, 310-12, and 310-13 with the same SSP identifier 320. As illustrated, at time T1, operating system 302 may map each of applications 310-11, 310-12, and 310-13 to the same streaming service SSP identifier 320-4 (e.g., SSP_StreamSrv of FIG. 2). When one of applications 310-11, 310-12, and 310-13 is launched and/or otherwise requests network access, operating system 302 may pass corresponding SSP identifier 320-4 to modem 304. Modem 304 may apply SSP identifier 320-4 as one of the Traffic Descriptors for a URSP message.

Assume that a mobile carrier enters into an agreement to provide users with a different level service for application 310-13 over applications 310-11 and 310-12 (e.g., free service with mobile subscription, higher QoS levels, etc.). For example, the owner/provider of application 310-13 may enter into a partnership with a mobile carrier to provide free or different levels of service for application 310-13. According to an implementation, operating system 302 may "untag" application 310-13 from SSP identifier 320-4 (e.g., remove an SSP ID association) and instead map application 310-13 to a carrier-specific SSP identifier 320-5 (e.g., SSP_CarrierCls3 of FIG. 2). Carrier-specific identifier may be one of the standardized SSP identifiers described above in connection with FIG. 2.

Instructions to change the mapping for application 310-13 to SSP identifier 320-5 may be provided, for example, as a software upgrade for application 310-13 or an operating system update for UE device 190. Conversely, instructions to update stored URSP rules in SIM 306 (or modem 304) based on the subscription change may be provided via Non-access Stratum (NAS) or an over-the-air (OTA) SIM update process. Thus, when application 310-13 is launched and/or otherwise requests network access, operating system 302 may pass corresponding SSP identifier 320-5 to modem 304. Modem 304 may then apply SSP identifier 320-5 as one of the Traffic Descriptors for a URSP message.

While FIG. 5 illustrates remapping an SSP identifier for a single application, in other implementations, OS 302 may remap multiple applications from different slicing classes (e.g., with different SSP identifiers) to a single new slicing class. For example, in the case of an enterprise with multiple preferred applications, an operating system update may be provided to identify an enterprise association for one or more software applications, and OS 302 may match the enterprise association to a carrier-specific slicing class (e.g., SSP_CarrierCls3 of FIG. 2).

Figure 6:
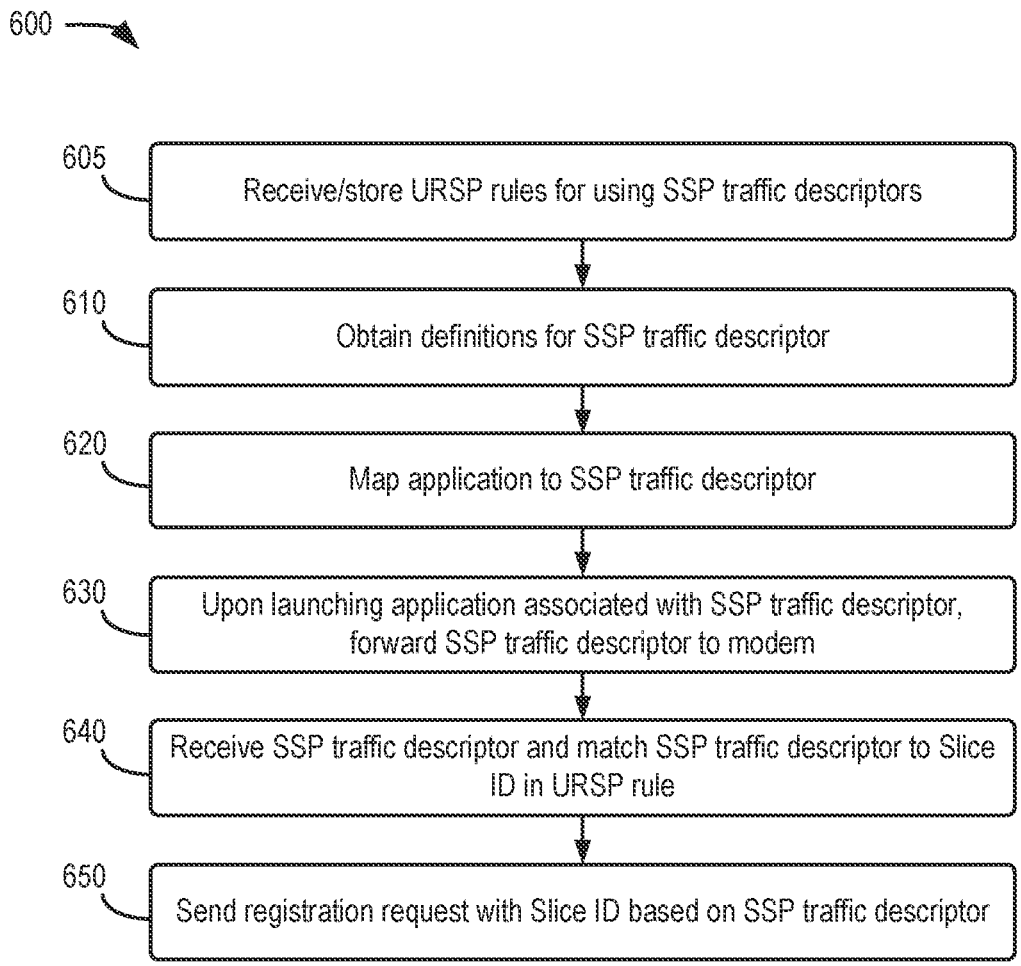
FIG. 6 is a flow diagram illustrating an exemplary process for providing route selection information with slicing classes.

FIG. 6 is a flow diagram illustrating an exemplary process 600 for providing route selection information with slicing classes. In one implementation, process 600 may be performed by UE device 190. In another implementation, process 600 may be performed by UE device 190 in conjunction with one or more other devices in network environment 100, such as core devices 155.

Process 600 may include receiving and storing URSP rules for SSP traffic descriptors (block 605), and obtaining definitions for SSP traffic descriptors (block 610). For example, a modem (e.g., modem 304) or UICC (e.g., SIM 306) may be configured, as part of an activation or upgrade procedure, with URSP rules to associate a network slice with an SSP Traffic Descriptor. Additionally, an operating system (e.g., OS 302) of UE device 190 may be provided with a data structure or another set of mapping rules to match application connection requirements with an SSP identifier. For example, system application programming interfaces (e.g., SSP APIs 308) to incorporate an SSP abstraction layer for applications may be added to the operating system.

Process 600 may further include mapping applications to SSP traffic descriptors (block 620), and upon launching of an application, forwarding an SSP traffic descriptor to a modem (block 630). For example, OS 302 may be configured with the ability to assign a single application or group of applications to an SSP identifier of a group of SSP identifiers 320. As described in connection with FIG. 3, OS 302 may associate multiple applications with the same or similar QoS requirement with a certain SSP identifier. When an application (e.g., application 310) is launched and needs to establish a session via core network 150, OS 302 may forward the SSP identifier associated with the application (e.g., but not the application identifier) to modem 304.

Process 600 may also include receiving the SSP traffic descriptor and matching the SSP traffic descriptor to a slice identifier based on a URSP rule (block 640), and sending registration request with the slice identifier for the application based on the SSP traffic descriptor (block 650). For example, as describe above in connection with FIG. 3, based on the stored URSP rules, modem 304 may receive an SSP Traffic Descriptor (e.g., SSP Identifier 320-1, without an application identifier) and match the SSP Traffic Descriptor to a corresponding route selection descriptor (e.g., RSD1). The route selection descriptor may include, for example, a network slice identifier for a network slice that corresponds to the QoS requirement for the launched application. Modem 304 may forward the slice identifier (possibly along with the SSP identifier) as part of an registration procedure for the application.

Figure 7:
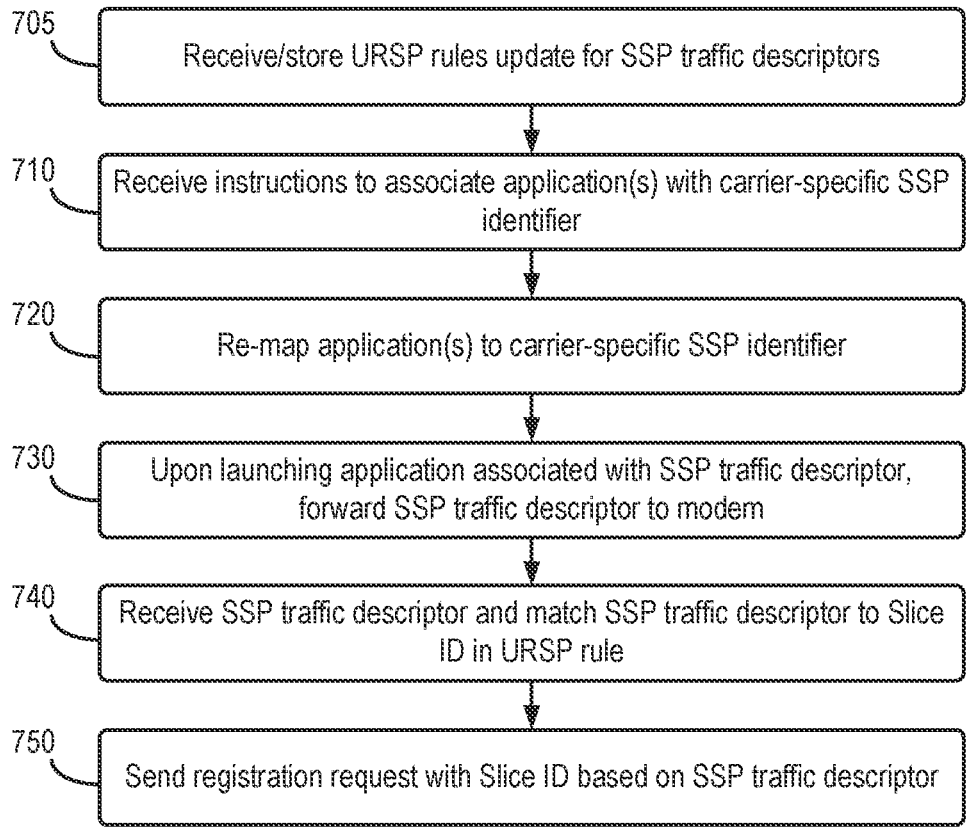
FIG. 7 is a flow diagram illustrating an exemplary process for changing slicing classes.

FIG. 7 is a flow diagram illustrating an exemplary process 700 for changing slicing classes. For example, according to an implementation, one or more applications may be mapped to a carrier-specific SSP identifier for different network treatment, such as treatment of enterprise applications or applications related to a carrier-application provider partnership. In one implementation, process 700 may be performed by UE device 190. In another implementation, process 700 may be performed by UE device 190 in conjunction with one or more other devices in network environment 100, such as core devices 155.

Process 700 may include receiving and storing URSP rule updates for SSP traffic descriptors (block 705), and receiving instructions to associate one or more applications with a carrier-specific SSP identifier (block 710). For example, a modem 304 and/or SIM 306 may be configured via an OTA update procedure with URSP rules to associate a network slice with a carrier-specific SSP Traffic Descriptor. For example, the SSP identifier "SSP_CarrierCls3" may be assigned to a particular mobile carrier (e.g., AT&T, VERIZON, T-MOBILE, etc.) that can provide a corresponding network slice with a desired combination of QoS attributes. Additionally, an operating system (e.g., OS 302) of UE device 190 may be provided with an updated data structure or another set of mapping rules to match one or more particular application IDs with a certain carrier-specific SSP identifier. For example, one or more applications may be associated with an enterprise that is assigned to a network slice that collectively handles multiple types of applications.

Process 700 may further include re-mapping the one or more applications to carrier specific SSP identifiers (block 720). For example, using the updated instructions, OS 302 may untag a designated application from a standard SSP identifier (e.g., SSP_StreamSrv) and map the designated application to the new SSP identifier (e.g., SSP_CarrierCls3).

With reconfiguration of the URSP Traffic Descriptor complete for the one or more designated applications, process 700 may continue with steps 730-750 in a manner similar to process blocks 630-650 describe above. Thus, upon launching of the particular application, OS 302 may forward the carrier-specific SSP identifier (e.g., SSP_CarrierCls3) to modem 304. Based on the updated URSP rules from process block 705, modem 304 may match the SSP Traffic Descriptor (e.g., SSP_CarrierCls3) to a corresponding route selection descriptor (e.g., RSD1). The route selection descriptor may include, for example, a network slice identifier for a network slice that correspond to the QoS requirement for the launched application. Modem 304 may forward the slice identifier (possibly along with the carrier-specific SSP identifier) as part of registration request for the application.

Figure 8:
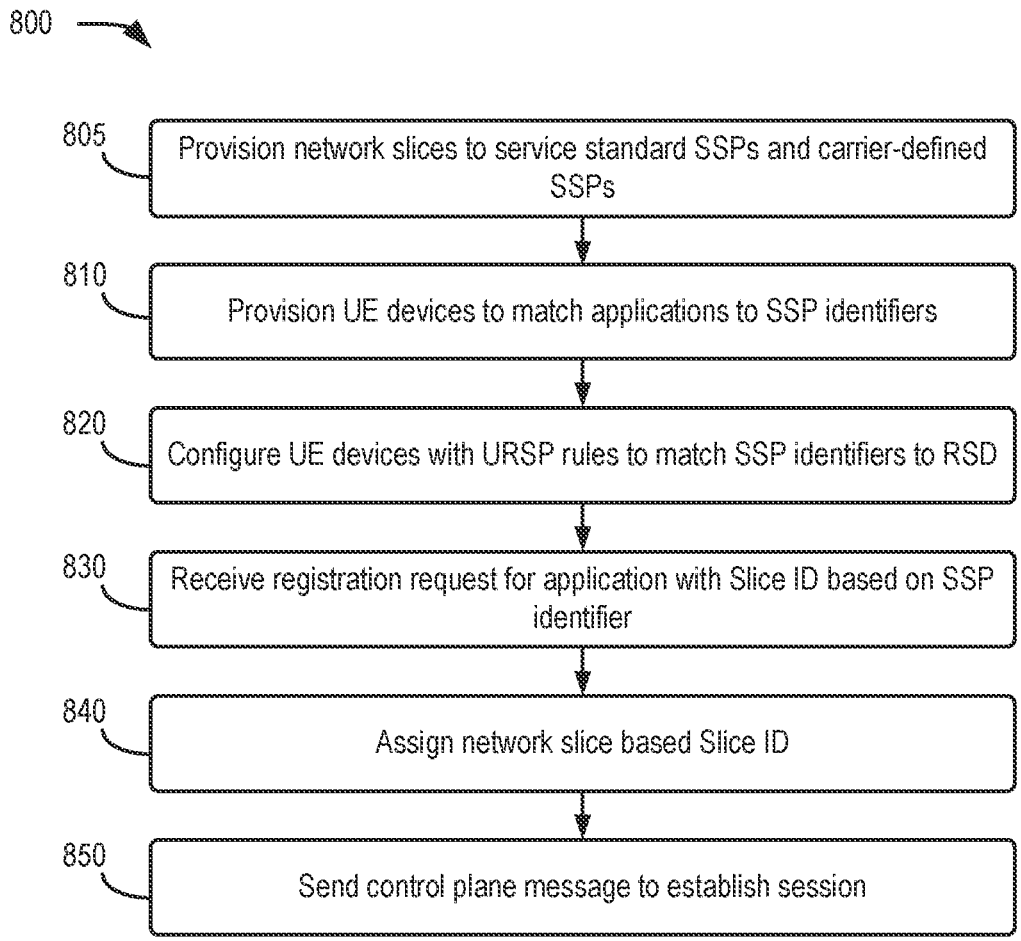
FIG. 8 is a flow diagram illustrating an exemplary process for assigning network slices for applications using slicing classes.

FIG. 8 is a flow diagram illustrating an exemplary process 800 for assigning network slices for applications using slicing classes. In one implementation, process 800 may be performed by core network device 155. In another implementation, process 800 may be performed by core network device 155 in conjunction with one or more other devices in network environment 100, such as UE device 190.

Process 800 may include provisioning network slices to service standard SSPs and carrier-defined SSPs (block 805), provisioning UE device with URSP rules to match applications to SSP identifiers (block 810), and configuring UE devices with URSP rules to match SSP identifiers to route selection descriptors (block 820). For example, core network devices 155 may provision network slices to meet service requirements for particular types of application, such as the different SSPs described in table 220 of FIG. 2. Operating systems and OS updates for UE devices 190 may also be configured to include standard SSP identifiers for different types of application traffic (e.g., such as traffic categories in SSP description field 222). Using NAS or an OTA updates, core network devices 155 may provide URSP rules to a SIM/modem of UE devices 190. The URSP rules may enable a modem (e.g., modem 304) to recognize an SSP identifier (e.g., received as a Traffic Descriptor) from an operating system (e.g., OS 302) and to match the SSP identifier to corresponding route selection descriptors directed to the network slices with characteristics that can support the application requirements.

Process 800 may also include receiving a registration request for applications with a slice identifier on the SSP identifier (block 830), assigning a network slice based on the slice identifier (block 835), and sending a control plane message to establish a session for the application (block 840). For example, as part of an attach request process, core network 150 may receive registration request (e.g., registration request 430) with a slice ID based on SSP. In response to registration request 430, core network 150 may generate a control plane message 435 to establish a session based on the RSD in registration request 430. The control plane message 435 may include, for example, network slice priority information pertaining to the application on UE device 190 that is requesting attachment. Core network 150 may transmit the control plane message 435 to UE device 190. UE device 190 may receive the control plane message and use the network slice priority information 445 to begin a session for the application.

Figure 9:
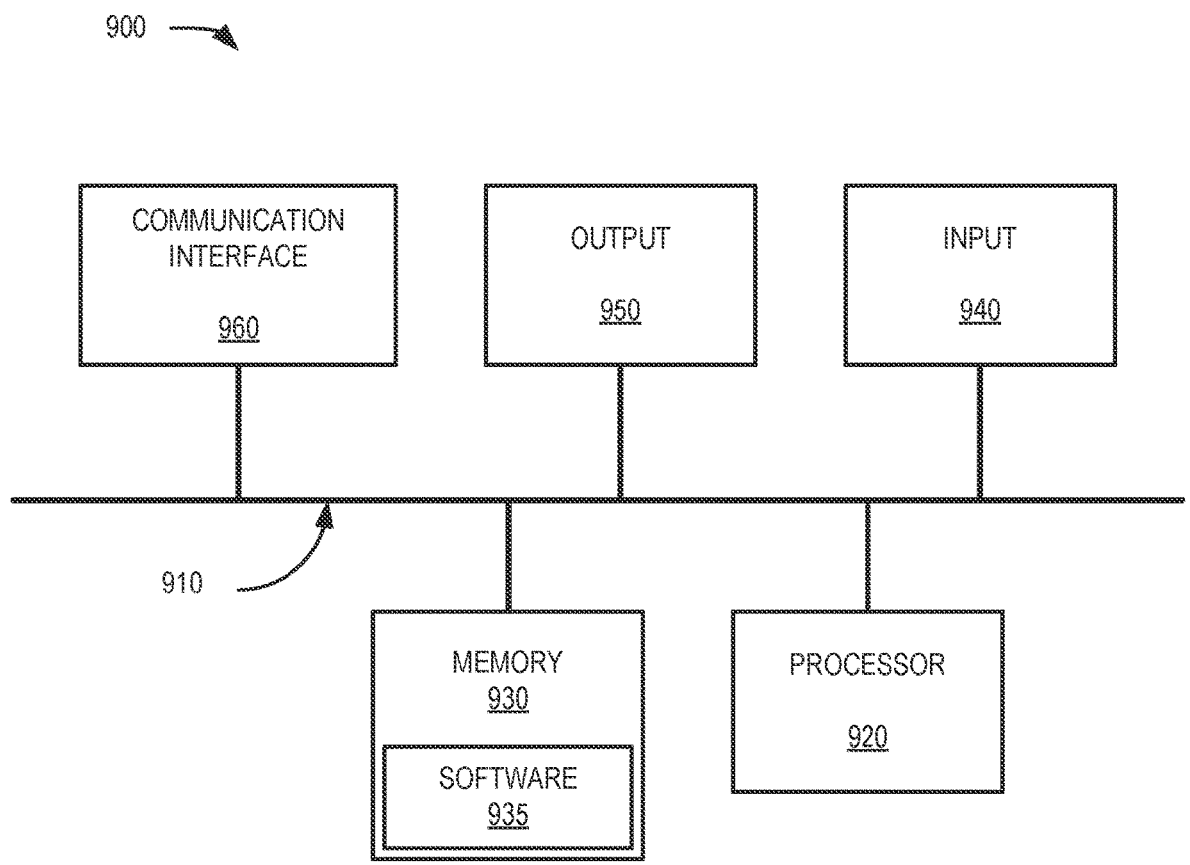
FIG. 9 is a diagram illustrating exemplary components of a device that may correspond to one or more of the devices illustrated and described herein.

FIG. 9 is a diagram illustrating exemplary components of a device 900 that may be included in one or more of the devices described herein. For example, device 900 may correspond to components included in access station 115, core devices 155, and UE device 190. As illustrated in FIG. 9, device 900 includes a communications channel 910, a processor 920, a memory 930 with software 935, an input device 940, an output device 950, and a communication interface 960. According to other embodiments, device 900 may include fewer components, additional components, different components, and/or a different arrangement of components than those illustrated in FIG. 9 and described herein.

Communication channel 910 may include a path that permits communication among the components of device 900. Processor 920 may include a processor, a microprocessor, or processing logic that may interpret and execute instructions.

Memory 930 may include one or more types of dynamic storage devices that may store information and instructions, for execution by processor 920, and/or any type of non-volatile storage device that may store information for use by processor 920. With respect to UE device 190, memory 930 includes a memory device that provides URSP services, as described herein. For example, the memory device may be implemented as a SIM card, a UICC, an eUICC, a smart card, or another type of storage device. The memory device may include logic that uses URSP Traffic Descriptors to manage network access to a network (e.g., access network 110, edge network 130, core network 150, etc.), as described herein. For example, the memory device may include an operating system, an application, a program, a module, a script, or other type of entity that may execute instructions to provide the logic of the URSP framework.

Software 935 includes an application or a program that provides a function and/or a process. As an example, with respect to UE device 190 or another network device (e.g., AMF/NSSF 415, etc.), software 935 may include code that, when executed by processor 920, provides a function for implementing slicing classes within a URSP framework, as described herein. Software 935 may also include firmware, middleware, microcode, hardware description language (HDL), and/or other form of instruction. Software 935 may also be virtualized. Software 935 may further include an operating system (e.g., Windows, Linux, Android, iOS, proprietary, etc.), such as OS 302.

Input device 940 may include a mechanism that permits a user to input information to device 900, such as a keyboard, a keypad, a button, a switch, touch screen, etc. Output device 950 may include a mechanism that outputs information to the user, such as a display, a speaker, one or more light emitting diodes (LEDs), etc.

Communication interface 960 permits device 900 to communicate with other devices, networks, systems, and/or the like. Communication interface 960 includes one or multiple wireless interfaces and/or wired interfaces. For example, communication interface 960 may include one or multiple transmitters and receivers, or transceivers. Communication interface 960 may operate according to a protocol stack and a communication standard. Communication interface 960 may include an antenna. Communication interface 960 may include various processing logic or circuitry (e.g., multiplexing/de-multiplexing, filtering, amplifying, converting, error correction, APIs, etc.). Communication interface 960 may be implemented as a point-to-point interface, a service based interface, etc. According to one implementation, communication interface 960 may implement one or more features of modem 304 described above.

Device 900 may perform certain operations in response to processor 920 executing software instructions (e.g., software 935) contained in a computer-readable medium, such as memory 930. A computer-readable medium may be defined as a non-transitory memory device. A non-transitory memory device may include memory space within a single physical memory device or spread across multiple physical memory devices. The software instructions may be read into memory 930 from another computer-readable medium or from another device. The software instructions contained in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Device 900 may include fewer components, additional components, different components, and/or differently arranged components than those illustrated in FIG. 9. As an example, in some implementations, a display may not be included in device 900. As another example, device 900 may include one or more switch fabrics instead of, or in addition to, communications channel 910. Additionally, or alternatively, one or more components of device 900 may perform one or more tasks described as being performed by one or more other components of device 900.

Systems and methods described herein use group segmentation of applications (referred to herein as "slicing classes"), based on common service requirements, to allow carriers to assign UE traffic to network slices. A UE stores slicing class definitions for use with UE Route Selection Policies (URSP). Each of the slicing class definitions include network quality of service (QoS) characteristics that are applicable to network traffic for multiple software applications. The UE maps the software applications to corresponding slicing class identifiers associated with the slicing class definitions. The UE also stores URSP rules for associating a slicing class identifier with a network slice identifier. A UE operating system sends, to a modem, one of the slicing class identifiers for an application that is requesting attachment to a wireless network. The modem sends an attachment request with a selected network slice identifier based on the received slicing class identifier and the URSP rules.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 6-8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 920, etc.), or a combination of hardware and software (e.g., software 935).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 920) of a device. A non-transitory storage medium includes one or more of the storage mediums described in relation to memory 930.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method, comprising:
   mapping, by a processor of a UE device, a software application to a slicing class identifier for a network;
   receiving, by the processor, a request from the software application to access the network;
   sending to a modem of the UE device, by the processor, the slicing class identifier in response to the request; and
   sending, by the modem, a registration request to the network, wherein the registration request includes a network slice identifier that is selected based on the slicing class identifier.

2. The method of claim 1, wherein the slicing class identifier corresponds to a network slicing class definition for network quality of service (QoS) characteristics.

3. The method of claim 2, further comprising:
mapping multiple software applications to the slicing class identifier, wherein multiple software applications have QoS requirements that are met by traffic features in the network slicing class definition.

4. The method of claim 1, further comprising:
storing, in a memory accessible to the modem, UE Route Selection Policy (URSP) rules for using slicing class identifiers, wherein the URSP rules associate the slicing class identifier with a network slice that is configured to support designated QoS requirements.

5. The method of claim 4, wherein the memory includes a secure element of the UE device.

6. The method of claim 1, wherein, when sending the slicing class identifier, the processor conceals an application identifier for the software application.

7. The method of claim 1, wherein the registration request does not include an application identifier for the software application.

8. The method of claim 1, wherein the slicing class identifier is a designated traffic descriptor for a UE Route Selection Policy (URSP) framework.

9. A user equipment (UE) device comprising:
a processor configured to:
map, by an operating system of the UE device, a software application to a corresponding slicing class identifier for a network,
receive, by the operating system, a request from the software application to access the network, and
send to a modem of the UE device, by the operating system, the corresponding slicing class identifier in response to the request; and
the modem configured to:
send, to the network, a registration request with a network slice identifier that is selected based on the slicing class identifier.

10. The UE device of claim 9, wherein the slicing class identifier corresponds to a network slicing class definition for network quality of service (QoS) characteristics.

11. The UE device of claim 10, wherein the processor is further configured to:
map multiple software applications to the corresponding slicing class identifier, wherein multiple software applications have QoS requirements that are met by traffic features in the network slicing class definition.

12. The UE device of claim 9, wherein the modem is further configured to:
store, in a memory, UE Route Selection Policy (URSP) rules for using slicing class identifiers, wherein the URSP rules associate the slicing class identifier with a network slice that is configured to support designated QoS requirements.

13. The UE device of claim 12, wherein the memory includes a subscriber identity module (SIM).

14. The UE device of claim 9, wherein the processor is further configured to:
conceal, from the modem, an application identifier for the software application when sending the corresponding slicing class identifier.

15. The UE device of claim 9, wherein the processor is further configured to:
send the registration request without including an application identifier for the software application.

16. The UE device of claim 11, wherein the slicing class identifier is a designated traffic descriptor for a UE Route Selection Policy (URSP) framework.

17. A non-transitory computer-readable storage medium storing instructions, executable by one or more processors of a user equipment (UE) device, for:
mapping, by an operating system of the UE device, a software application to a corresponding slicing class identifier for a network;
receiving, by the operating system, a request from the software application to access the network;
sending to a modem of the UE device, by the operating system, the corresponding slicing class identifier in response to the request; and
sending, by the modem, a registration request to the network, wherein the registration request includes a network slice identifier that is selected based on the slicing class identifier.

18. The non-transitory computer-readable storage medium of claim 17, wherein the slicing class identifier corresponds to a network slicing class definition for network quality of service (QoS) characteristics, and wherein the computer-readable storage medium further stores instructions for:
mapping multiple software applications to the corresponding slicing class identifier, wherein multiple software applications have QoS requirements that are met by traffic features in the network slicing class definition.

19. The non-transitory computer-readable storage medium of claim 17, further comprising instructions for:
storing, in a memory accessible to the modem, UE Route Selection Policy (URSP) rules for using slicing class identifiers, wherein the URSP rules associate the slicing class identifier with a network slice that is configured to support designated QoS requirements.

20. The non-transitory computer-readable storage medium of claim 17, wherein the instructions for sending to the modem the corresponding slicing class identifier further comprise instructions for:
concealing an application identifier for the software application.

* * * * *